United States Patent
Zhao et al.

(10) Patent No.: US 12,478,664 B2
(45) Date of Patent: Nov. 25, 2025

(54) USE OF GENETICALLY ENGINEERED STRAIN VNP20009-M IN PREVENTING AND TREATING CANCER METASTASIS

(71) Applicant: GUANGZHOU SINOGEN PHARMACEUTICAL CO., LTD., Guangzhou (CN)

(72) Inventors: Allan Zijian Zhao, Nanjing (CN); Sujin Zhou, Nanjing (CN); Yan Lin, Nanjing (CN); Zhenggang Zhao, Nanjing (CN); Fanghong Li, Nanjing (CN)

(73) Assignee: GUANGZHOU SINOGEN PHARMACEUTICAL CO., LTD., Guangzhou (CN)

( * ) Notice: Subject to any disclaimer, the term of this patent is extended or adjusted under 35 U.S.C. 154(b) by 0 days.

(21) Appl. No.: 15/706,754

(22) Filed: Sep. 17, 2017

(65) Prior Publication Data

US 2018/0008682 A1 Jan. 11, 2018

Related U.S. Application Data

(63) Continuation-in-part of application No. PCT/CN2016/074408, filed on Feb. 24, 2016.

(30) Foreign Application Priority Data

Mar. 17, 2015 (CN) .................. 201510117994.X
Feb. 5, 2016 (CN) .................. 201610081270.9

(51) Int. Cl.
| | |
|---|---|
| A61K 35/74 | (2015.01) |
| A61K 38/51 | (2006.01) |
| A61P 35/04 | (2006.01) |
| C12N 9/88 | (2006.01) |

(52) U.S. Cl.
CPC .............. *A61K 38/51* (2013.01); *A61K 35/74* (2013.01); *A61P 35/04* (2018.01); *C12N 9/88* (2013.01); *C12Y 404/01011* (2013.01); *Y02A 50/30* (2018.01)

(58) Field of Classification Search
CPC ........ A61K 48/00; A61K 38/51; C12N 15/74; C12N 9/88; C12R 1/42; C12Y 404/01011
See application file for complete search history.

(56) References Cited

U.S. PATENT DOCUMENTS

| | | |
|---|---|---|
| 5,888,506 A | 3/1999 | Tan |
| 6,190,657 B1 | 2/2001 | Pawelek et al. |
| 8,524,220 B1 | 9/2013 | Bermudes |
| 8,822,194 B2 | 9/2014 | Zhao et al. |
| 9,068,187 B1 | 6/2015 | Bermudes |
| 9,200,251 B1 | 12/2015 | Bermudes |
| 9,365,625 B1 | 6/2016 | Bermudes |
| 9,439,934 B1 | 9/2016 | Zhao et al. |
| 9,816,083 B2 | 11/2017 | Lin et al. |
| 2003/0129262 A1* | 7/2003 | Epner ............... A23L 33/30 424/94.63 |
| 2004/0229338 A1* | 11/2004 | King ............... A61K 31/675 435/252.3 |
| 2009/0300779 A1 | 12/2009 | Zhao et al. |
| 2014/0220661 A1* | 8/2014 | Bermudes ........... A61K 39/145 435/252.3 |
| 2015/0376593 A1 | 12/2015 | Lin et al. |
| 2016/0194718 A1* | 7/2016 | Lane ............... C12Q 1/6886 514/217.01 |
| 2017/0051260 A1 | 2/2017 | Bermudes |
| 2018/0008682 A1 | 1/2018 | Zhao et al. |

FOREIGN PATENT DOCUMENTS

| | | | |
|---|---|---|---|
| CN | 1420783 | A | 5/2003 |
| CN | 101010002 | A | 8/2007 |
| CN | 101579362 | A | 11/2009 |
| CN | 103146626 | * | 6/2013 |
| CN | 103146626 | A | 6/2013 |
| CN | 103656684 | A | 3/2014 |
| CN | 103961721 | A | 8/2014 |
| CN | 103146626 | B | 12/2014 |
| CN | 103656684 | B | 2/2016 |
| CN | 105983103 | A | 10/2016 |
| CN | 10647448 | A | 3/2017 |
| EP | 1781096 | B1 | 2/2016 |
| JP | 2013048630 | A | 3/2013 |
| KR | 10-2002-0059605 | | 7/2002 |
| WO | 03063593 | A1 | 8/2003 |
| WO | 2006004992 | A1 | 1/2006 |
| WO | 2014131363 | A1 | 9/2014 |
| WO | 2017036302 | A1 | 3/2017 |

OTHER PUBLICATIONS

He et al., 2007, Proc. Intl. Soc. Mag. Reson. Med. 15:2836.*
Ganai et al.2009, British J. of Cancer 101:1683-1691.*
Toso et al., Phase I Study of the Intravenous Administration of Attenuated *Salmonella typhimurium* to Patients With Metastatic Melanoma.J Clin Oncol. Jan. 1, 2002; 20(1): 142-152. (Year: 2002).*
Machover et al., Treatment of Cancer Cells with Methioninase Produces DNA Hypomethylation and Increases DNA Synthesis. Cancer Research 62, 4685-4689, Aug. 15, 2002 (Year: 2002).*
Herbst et al., Paclitaxel/carboplatin administration along with antiangiogenic therapy in non-small-cell lung and breast carcinoma models. Cancer Chemother Pharmacol. 1998;41(6):497-504. (Year: 1998).*

(Continued)

*Primary Examiner* — Arthur S Leonard
(74) *Attorney, Agent, or Firm* — Junhe Law Office, P.C.; Yi Zhang

(57) ABSTRACT

The present disclosure provides uses of genetically engineered attenuated *Salmonella typhimurium* strain VNP20009-M in preventing and treating cancer metastasis. The genetically engineered strain VNP20009-M is targeted to cancer cells and has a significant effect of inhibiting metastasis and growth. VNP20009-M can be used to prepare medicaments for the prevention and treatment of tumor metastasis.

6 Claims, 12 Drawing Sheets

Specification includes a Sequence Listing.

(56) References Cited

OTHER PUBLICATIONS

Cunningham et al., A phase I trial of genetically modified *Salmonella typhimurium* expressing cytosine deaminase (TAPET-CD, VNP20029) administered by intratumoral injection in combination with 5-fluorocytosine for patients with advanced or metastatic cancer. Hum Gene Ther. Aug. 10, 2001;12(12):1594-6 (Year: 2001).*
Lorns et al., A New Mouse Model for the Study of Human Breast Cancer Metastasis. PLoS One 7(10): e47995. doi: 10.1371/journal.pone.0047995 (Year: 2012).*
Keller et al., Preclinical Murine Models for Lung Cancer: Clinical Trial Applications. BioMed Research International. 2015:1-17 (Year: 2015).*
Loeffler et al., Attenuated *Salmonella* engineered to produce human cytokine LIGHT inhibit tumor growth. PNAS, 2007, 104:12879-12883. (Year: 2007).*
Zhao et al., Monotherapy with a tumor-targeting mutant of *Salmonella typhimurium* cures orthotopic metastatic mouse models of human prostate cancer. PNAS, 2007, 104:10170-10174. (Year: 2007).*
Hayashi et al. Cancer Metastasis Directly Eradicated by Targeted Therapy Witha Modified *Salmonella typhymurium*. J Cell Biochem, 2009, 106:992-998 (Year: 2009).*
Yoshioka et al., Anticancer efficacy in vivo and in vitro, synergy with 5-fluorouracil, and safety of recombinant methioninase. Cancer Res. Jun. 15, 1998;58(12):2583-7. (Year: 1998).*
Saltzman et al. Antitumor Mechanisms of Attenuated *Salmonella typhimurium* Containing the Gene for Human Interleukin-2: A Novel Antitumor Agent? Journal of Pediatric Surgery, vol. 32, No. 2 (February), 1997: pp. 301-306 (Year: 1997).*
Extended European Search Report issued on Sep. 25, 2018.
Zhou Yi_Ming et al, "Study of hypotoxicity and tumor-targeting ability of attenuated *Salmonella* as a vector for cancer gene therapy", Fudan Xuebao (Yixueban), vol. 35, No. 3, May 2008 (May 2008), pp. 336-341, XP009507925, ISSN: 1672-8467.
Luo, X et al., "Antitumor Effect of VNP20009, an Attenuated *Salmonella*, in Murine Tumor Models", Oncology Research (2001), vol. 12(11-12), pp. 501-508.
The translation of the Notice of Reasons for Rejection in Japanese Patent Application No. 2017-567516, issued on Oct. 1, 2019.
"In tumors *Salmonella* migrate away from vasculature toward the transition zone and induce apoptosis", Cancer Gene Therapy, 2011. vol. 18, No. 7, pp. 457-466.
Notice of Preliminary Rejection of the corresponding KR application mailed on May 15, 2023.
He Qiuhong et al: "2836 Longitudinal Diffusion-Weighted MRI Study of the Tumor Tissue Destruction Process Induced by Novel Attenuated *Salmonella typhimurium* Expressing Protein Drugs", ISMRM-ESMRMB Joint (15th) Annual Meeting 2007: May 19-25, 2007, Berlin, Germany, vol. 5, ISMRM, US, vol. 15, No. 5, Jan. 1, 2007 (Jan. 1, 2007), p. 2836, XP009507925, ISBN: 978-1-60560-061-1.
Communication pursuant to Article 94(3) EPC for EP16764155.4, mailed on Nov. 29, 2023.
Notice of Preliminary Rejection for counterpart KR10-2017-7029565, mailed on Apr. 18, 2024.

* cited by examiner

Time of administration (days)

SEQUENCE LISTING

```
<160> NUMBER OF SEQ ID NOS: 3

<210> SEQ ID NO 1
<211> LENGTH: 1197
<212> TYPE: DNA
<213> ORGANISM: Homo sapiens

<400> SEQUENCE: 1
atgcgcgact cccataacaa caccggtttt tccacacggg ccattcacca cggctacgac      60
ccgctttccc acggtggtgc cttggtgcca ccggtgtacc agaccgcgac ctatgccttc     120
ccgactgtcg aatacggcgc tgcgtgcttc gccggggagg aggcggggca cttctacagc     180
cgcatctcca accccaccct ggccttgctc gagcaacgca tggcctcgtt ggagggtggt     240
gaggcgggat tggcgctggc gtcggggatg ggagccatta cttcgaccct ctggaccctg     300
ctgcggcctg gtgatgagct gatcgtgggg cgcaccttgt atggctgcac ctttgcgttc     360
ctgcaccatg gcattggcga gttcggggtc aagatccacc atgtcgacct taacgatgcc     420
aaggccctga aagcggcgat caacagcaaa acgcggatga tctacttcga aacaccggcc     480
aaccccaaca tgcaactggt ggatatagcg gcggtcgtcg aggcagtgcg ggggagtgat     540
gtgcttgtgg tggtcgacaa cacctactgc acgccctacc tgcagcggcc actggaactg     600
ggggcagacc tggtggtgca ttcggcaacc aagtacctca gtggccatgg cgacatcact     660
gcgggcctgg tggtggggcg caaggctttg gtcgaccgca ttcggctgga agggctgaaa     720
gacatgaccg gggcagcctt gtcaccgcat gacgctgcgt tgttgatgcg cggcatcaag     780
accctggcgc tgcgcatgga ccggcattgc gccaacgccc tggaggtcgc gcagttcctg     840
gccgggcagc cccaggtgga gctgatccac taccgggct tgccgtcgtt tgcccagtac     900
gaactggcac agcggcagat gcgtttgccg ggcggatga ttgcctttga gctcaagggc     960
ggtatcgagg ccgggcgcgg cttcatgaat gccctgcagc tttttgcccg tgcggtgagc    1020
```

```
ctgggggatg ccgagtcgct ggcacagcac ccggcgagca tgacgcactc cagttacacg    1080
ccacaagagc gggcgcatca cgggatatca gaggggctgg tgaggttgtc agtgggctg     1140 gaggatgtgg aggacctgct ggcagatatc gagttggcgt tggaggcgtg tgcatga       1197
```

<210> SEQ ID NO 2
<211> LENGTH: 398
<212> TYPE: PRT
<213> ORGANISM: Homo sapiens

<400> SEQUENCE: 2

```
Met Arg Asp Ser His Asn Asn Thr Gly Phe Ser Thr Arg Ala Ile His
1               5                   10                  15

His Gly Tyr Asp Pro Leu Ser His Gly Gly Ala Leu Val Pro Pro Val
            20                  25                  30

Tyr Gln Thr Ala Thr Tyr Ala Phe Pro Thr Val Glu Tyr Gly Ala Ala
        35                  40                  45

Cys Phe Ala Gly Glu Glu Ala Gly His Phe Tyr Ser Arg Ile Ser Asn
    50                  55                  60

Pro Thr Leu Ala Leu Leu Glu Gln Arg Met Ala Ser Leu Glu Gly Gly
65                  70                  75                  80

Glu Ala Gly Leu Ala Leu Ala Ser Gly Met Gly Ala Ile Thr Ser Thr
                85                  90                  95

Leu Trp Thr Leu Leu Arg Pro Gly Asp Glu Leu Ile Val Gly Arg Thr
            100                 105                 110

Leu Tyr Gly Cys Thr Phe Ala Phe Leu His His Gly Ile Gly Glu Phe
        115                 120                 125

Gly Val Lys Ile His His Val Asp Leu Asn Asp Ala Lys Ala Leu Lys
    130                 135                 140

Ala Ala Ile Asn Ser Lys Thr Arg Met Ile Tyr Phe Glu Thr Pro Ala
145                 150                 155                 160

Asn Pro Asn Met Gln Leu Val Asp Ile Ala Ala Val Val Glu Ala Val
                165                 170                 175

Arg Gly Ser Asp Val Leu Val Val Asp Asn Thr Tyr Cys Thr Pro
            180                 185                 190

Tyr Leu Gln Arg Pro Leu Glu Leu Gly Ala Asp Leu Val Val His Ser
        195                 200                 205

Ala Thr Lys Tyr Leu Ser Gly His Gly Asp Ile Thr Ala Gly Leu Val
    210                 215                 220

Val Gly Arg Lys Ala Leu Val Asp Arg Ile Arg Leu Glu Gly Leu Lys
225                 230                 235                 240

Asp Met Thr Gly Ala Ala Leu Ser Pro His Asp Ala Ala Leu Leu Met
                245                 250                 255

Arg Gly Ile Lys Thr Leu Ala Leu Arg Met Asp Arg His Cys Ala Asn
            260                 265                 270

Ala Leu Glu Val Ala Gln Phe Leu Ala Gly Gln Pro Gln Val Glu Leu
        275                 280                 285

Ile His Tyr Pro Gly Leu Pro Ser Phe Ala Gln Tyr Glu Leu Ala Gln
    290                 295                 300

Arg Gln Met Arg Leu Pro Gly Gly Met Ile Ala Phe Glu Leu Lys Gly
305                 310                 315                 320

Gly Ile Glu Ala Gly Arg Gly Phe Met Asn Ala Leu Gln Leu Phe Ala
                325                 330                 335

Arg Ala Val Ser Leu Gly Asp Ala Glu Ser Leu Ala Gln His Pro Ala
```

```
              340             345             350
Ser Met Thr His Ser Ser Tyr Thr Pro Gln Glu Arg Ala His His Gly
            355             360             365

Ile Ser Glu Gly Leu Val Arg Leu Ser Val Gly Leu Glu Asp Val Glu
            370             375             380

Asp Leu Leu Ala Asp Ile Glu Leu Ala Leu Glu Ala Cys Ala
385             390             395

<210> SEQ ID NO 3
<211> LENGTH: 3646
<212> TYPE: DNA
<213> ORGANISM: Homo sapiens

<400> SEQUENCE: 3
ctgtggaatg tgtgtcagtt agggtgtgga aagtccccag gctccccagc aggcagaagt      60
atgcaaagca tgcatctcaa ttagtcagca accaggtgtg aaagtcccc aggctcccca     120 gcaggcagaa gtatgcaaag catgcatctc aattagtcag caaccatagt cccgccccta    180
actccgccca tcccgcccct aactccgccc agttccgccc attctccgcc ccatggcgta    240 ctaattttt ttatttatgc agaggccgag gccgcctcgg cctctgagct attccagaag     300
tagtgaggag cttttttgg aggcctaggc ttttgcaaaa agctatttag gtgacactat     360
agaaggtacg cctgcaggta ccggtccgga attccatgga cgaggagagg ctcagcgaca    420
atgtgaggct ctataaagga ggctccatcc ggcaggggct gcgatccttc gctgctgttt    480
acgtcctcct ggcgctctcc ttcctcctcc tcaccctgct gagctccgtc tcattagcca    540
gaattgctgc tctctcctcc aagctcagca ctctgcagtc ggagccgaag cacaacttct    600
ccagccgggt atgagcccat ctatctggga ggggtcttcc agctggagaa gggtgaccga    660
ctcagcgctg agatcaatcg gcccgactat ctcgactttg ccgagtctgg gcaggtctac    720
tttgggatca ttgccctggc ggccgcaggt gcgccggtgc cgtatccgga tccgctggaa    780
ccgcgtgccg catagactgt tgaaagttgt ttagcaaaac ctcatacaga aaattcattt    840
actaacgtct ggaaagacga caaaacttta gatcgttacg ctaactatga gggctgtctg    900
tggaatgtcg actctagagg atccaagctt acgtacgcgt gcatgcgacg tcatagctct    960
ctccctatag tgagtcgtat tataagctag cttgggatct ttgtgaagga accttacttc   1020
tgtggtgtga cataattgga caaactacct acagagattt aaagctctaa ggtaaatata   1080
aaatttttaa gtgtataatg tgttaaacta gctgcatatg cttgctgctt gagagttttg   1140
cttactgagt atgatttatg aaaatattat acacaggagc tagtgattct aattgtttgt   1200 gtatttaga ttcacagtcc caaggctcat tcaggcccc tcagtcctca cagtctgttc     1260
atgatcataa tcagccatac cacatttgta gaggttttac ttgctttaaa aaacctccca   1320 cacctcccc tgaacctgaa acataaaatg aatgcaattg ttgttgttaa cttgtttatt    1380
gcagcttata atggttacaa ataaagcaat agcatcacaa atttcacaaa taaagcattt   1440
ttttcactgc attctagttg tggtttgtcc aaactcatca atgtatctta tcatgtctgg   1500
atcctgcatt aatgaatcgg ccaacgcgcg gggagaggcg gtttgcgtat gggcgctct    1560 tccgcttcct cgctcactga ctcgctgcgc tcggtcgttc ggctgcggcg agcggtatca   1620
gctcactcaa aggcggtaat acggttatcc acagaatcag gggataacgc aggaaagaac   1680
atgtgagcaa aaggccagca aaaggccagg aaccgtaaaa aggccgcgtt gctggcgttt   1740
ttccataggc tccgcccccc tgacgagcat cacaaaaatc gacgctcaag tcagaggtgg   1800
```

```
cgaaacccga caggactata aagataccag gcgtttcccc ctggaagctc cctcgtgcgc   1860
tctcctgttc cgaccctgcc gcttaccgga tacctgtccg cctttctccc ttcgggaagc   1920
gtggcgcttt ctcaatgctc acgctgtagg tatctcagtt cggtgtaggt cgttcgctcc   1980
aagctgggct gtgtgcacga acccccgtt cagcccgacc gctgcgcctt atccggtaac    2040
tatcgtcttg agtccaaccc ggtaagacac gacttatcgc cactggcagc agccactggt   2100
aacaggatta gcagagcgag gtatgtaggc ggtgctacag agttcttgaa gtggtggcct   2160
aactacggct acactagaag gacagtattt ggtatctgcg gccagttacc ttcggaaaaa   2220
gagttggtag ctcttgatcc ggcaaacaaa ccaccgctgg tagcggtggt tttttgttt    2280 gcaagcagca gattacgcgc agaaaaaag gatctcaaga agatcctttg atcttttcta    2340
cggggtctga cgctcagtgg aacgaaaact cacgttaagg gattttggtc atgagattat   2400 caaaaggat cttcacctag atcctttaa attaaaatg aagttttaaa tcaatctaaa      2460
gtatatatga gtaaacttgg tctgacagtt accaatgctt aatcagtgag gcacctatct   2520
cagcgatctg tctatttcgt tcatccatag ttgcctgact ccccgtcgtg tagataacta   2580
cgatacggga gggcttacca tctggcccca gtgctgcaat gataccgcga gacccacgct   2640
caccggctcc agatttatca gcaataaacc agccagccgg aagggccgag cgcagaagtg   2700
gtcctgcaac tttatccgcc tccatccagt ctattaattg ttgccgggaa gctagagtaa   2760
gtagttcgcc agttaatagt ttgcgcaacg ttgttgccat tgctacaggc atcgtggtgt   2820
cacgctcgtc gtttggtatg gcttcattca gctccggttc ccaacgatca aggcgagtta   2880
catgatcccc catgttgtgc aaaaaagcgg ttagctcctt cggtcctccg atcgttgtca   2940
gaagtaagtt ggccgcagtg ttatcactca tggttatggc agcactgcat aattctctta   3000
ctgtcatgcc atccgtaaga tgcttttctg tgactggtga gtactcaacc aagtcattct   3060
gagaatagtg tatgcggcga ccgagttgct cttgcccggc gtcaatacgg gataataccg   3120
cgccacatag cagaacttta aaagtgctca tcattggaaa acgttcttcg gggcgaaaac   3180
tctcaaggat cttaccgctg ttgagatcca gttcgatgta acccactcgt gcacccaact   3240
gatcttcagc atcttttact ttcaccagcg tttctgggtg agcaaaaaca ggaaggcaaa   3300
atgccgcaaa aaagggaata agggcgacac ggaaatgttg aatactcata ctcttccttt   3360
ttcaatatta ttgaagcatt tatcagggtt attgtctcat gagcggatac atatttgaat   3420
gtatttagaa aaataaacaa ataggggttc cgcgcacatt tccccgaaaa gtgccacctg   3480
acgtctaaga aaccattatt atcatgacat taacctataa aaataggcgt atacgaggcc   3540 cttttcactca ttaggcaccc caggctttac actttatagc ttccggctcg tataatgtgt   3600
ggaattgtga gcggataaca atttcacaca ggaaacagca tcgatg                  3646
```

USE OF GENETICALLY ENGINEERED STRAIN VNP20009-M IN PREVENTING AND TREATING CANCER METASTASIS

CROSS-REFERENCE TO RELATED APPLICATIONS

This application is a continuation in part of PCT/CN2016/074408, filed Feb. 24, 2016, which claims priority to Chinese patent application no. 201510117994.x, filed Mar. 17, 2015, and Chinese patent application no. 201610081270.9, filed Feb. 5, 2016, the disclosure of which is incorporated herein by reference.

FIELD OF THE INVENTION

The present invention relates to the field of pharmaceutical technology, and in particular, to the use of genetically engineered strain VNP20009-M in preventing and treating cancers.

BACKGROUND OF THE INVENTION

Malignant tumors are major diseases that threat human health and survival in today's society. According to the statistical data of World Health Organization (WHO), there are about 14 million new patients with cancers in the world in 2012, and about 8.2 million patients died of cancers. In China, according to the data released by China's Cancer Registration Center in 2012, there are about 3.5 million new cases of cancers annually, and about 2.5 million of cases die. Tumor metastasis is the most important cause of death for patients with cancers. Tumor metastasis is a complex, multi-step biological process, in which cancer cells evolve to metastasize through the circulatory system and survive in a distant site, forming the tumor of the same type as the primary tumor. Metastasis, as a major malignant manifestation of the tumor, seriously affects the treatment efficacy and prognosis of cancer patients. Approximately 50% of the patients have metastasis when primary tumor is diagnosed clinically. The tumor metastasis is the biggest killer of cancer patients, and also the biggest bottleneck in cancer treatment. Among the wide range of anti-cancer drugs in today's market, most of the clinically used first-line chemotherapy drugs (such as doxorubicin, doxorubicin, paclitaxel, etc.) affect the survival, proliferation, vascular survival of tumors, but rarely target tumor metastasis. Moreover, the only few anti-metastatic drugs that are available have limited efficacy due to great side effects and drug resistance, etc. Therefore, there is a long-term urgent need of anti-metastatic drugs on the market, and it is of great significance to develop the drugs to treat tumor metastasis.

SUMMARY

In one aspect, the present disclosure provides a method for preventing or treating metastasis of a cancer in a subject. In one embodiment, the method comprises administering a therapeutically effective amount of a genetically engineered strain VNP20009-M to the subject.

In one embodiment, the genetically engineered strain VNP20009-M is an attenuated *Salmonella typhimurium* VNP20009 cloned with an L-methioninase gene. In certain embodiments, the genetically engineered bacterium VNP20009-M is an attenuated *Salmonella typhimurium* VNP20009 which comprises a plasmid cloned with an L-methioninase gene.

In one embodiment, the cancer is selected from the group consisting of lung cancer, breast cancer, prostate cancer, pancreatic cancer, liver cancer, colon cancer, rectal cancer, gastric cancer, esophageal cancer, laryngeal cancer, leukemia, lymphoma, melanoma, uterine cancer, ovarian cancer, skin cancer, bronchial carcinoma, bronchiolar carcinoma, urethral cancer, kidney cancer, oral cancer, vaginal cancer, cholangiocarcinoma, bladder cancer and nasopharyngeal carcinoma.

In one embodiment, the genetically engineered strain VNP20009-M is constructed according to the following method: subcloning the L-methioninase gene into a plasmid to obtain L-methioninase expression plasmid; electro-transforming the L-methioninase expression plasmid to attenuated *Salmonella typhimurium* VNP20009; and obtaining the VNP20009-M.

In certain embodiments, the plasmid is a pSVSPORT plasmid, a pTrc99A plasmid, a pcDNA3.1 plasmid, a pBR322 plasmid or a pET23a plasmid.

In certain embodiments, the routes of administration for preventing and treating cancers include, but not limited to, oral administration, topical administration, injection administration (including but not limited to intravenous, peritoneal, subcutaneous, intramuscular, intratumoral administration), etc.

In another aspect, the present disclosure provides a method for inhibiting histone methyltransferase EZH2 of a cell in a subject. In one embodiment, the method comprises a therapeutically effective amount of a genetically engineered strain VNP20009-M to the subject, wherein the genetically engineered strain VNP20009-M is an attenuated *Salmonella typhimurium* VNP20009 cloned with an L-methioninase gene.

These and other features, aspects, and advantages of the present invention will become better understood with regard to the following description, appended claims and accompanying drawings.

DETAILED DESCRIPTION OF THE INVENTION

Figure 1:
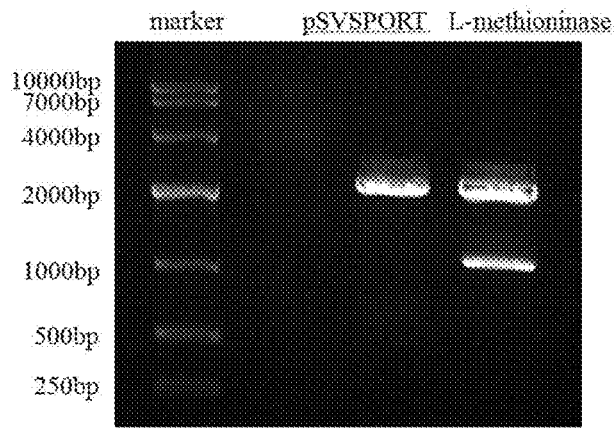
FIG. 1 shows the 1% agarose gel electrophoresis of plasmid pSVSPORT-L-methioninase digestion assay.

In the Summary of the Invention above and in the Detailed Description of the Invention, and the claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or particular claim, that feature can also be used, to the extent possible, in combination with and/or in the context of other particular aspects and embodiments of the invention, and in the invention generally.

It is noted that in this disclosure, terms such as "comprises", "comprised", "comprising", "contains", "containing" and the like have the meaning attributed in United States Patent law; they are inclusive or open-ended and do not exclude additional, un-recited elements or method steps. Terms such as "consisting essentially of" and "consists essentially of" have the meaning attributed in United States Patent law; they allow for the inclusion of additional ingredients or steps that do not materially affect the basic and novel characteristics of the claimed invention. The terms "consists of" and "consisting of" have the meaning ascribed to them in United States Patent law; namely that these terms are close ended.

Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

Where a range of value is provided, it is understood that each intervening value, to the tenth of the unit of the lower limit unless the context clearly dictate otherwise, between the upper and lower limit of that range and any other stated or intervening value in that stated range, is encompassed within the disclosure, subject to any specifically excluded limit in the stated range. Where the stated range includes one or both of the limits, ranges excluding either or both of those included limits are also included in the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, the embodiments described herein can be practiced without there specific details. In other instances, methods, procedures and components have not been described in detail so as not to obscure the related relevant function being described. Also, the description is not to be considered as limiting the scope of the implementations described herein. It will be understood that descriptions and characterizations of the embodiments set forth in this disclosure are not to be considered as mutually exclusive, unless otherwise noted.

Definitions

It is to be understood that both the foregoing general description and the following detailed description are exemplary and explanatory only and are not restrictive of the invention as claimed. In this application, the use of the singular includes the plural unless specifically stated otherwise. In this application, the use of "or" means "and/or" unless stated otherwise. Furthermore, the use of the term "including", as well as other forms, such as "includes" and "included", is not limiting. Also, terms such as "element" or "component" encompass both elements and components comprising one unit and elements and components that comprise more than one subunit unless specifically stated otherwise. Also, the use of the term "portion" can include part of a moiety or the entire moiety.

As used herein, the singular forms "a", "an" and "the" include plural references unless the context clearly dictates otherwise.

As used herein, the term "cancer" refers to any diseases involving an abnormal cell growth and includes all stages and all forms of the disease that affects any tissue, organ or cell in the body. The term includes all known cancers and neoplastic conditions, whether characterized as malignant, benign, soft tissue, or solid, and cancers of all stages and grades including pre- and post-metastatic cancers. In general, cancers can be categorized according to the tissue or organ from which the cancer is located or originated and morphology of cancerous tissues and cells. As used herein, cancer types include, acute lymphoblastic leukemia (ALL), acute myeloid leukemia, adrenocortical carcinoma, anal cancer, astrocytoma, childhood cerebellar or cerebral, basal-cell carcinoma, bile duct cancer, bladder cancer, bone tumor, brain cancer, breast cancer, Burkitt's lymphoma, cerebellar astrocytoma, cerebral astrocytoma/malignant glioma, cervical cancer, chronic lymphocytic leukemia, chronic myelogenous leukemia, colon cancer, emphysema, endometrial cancer, ependymoma, esophageal cancer, Ewing family of tumors, Ewing's sarcoma, gastric (stomach) cancer, glioma, head and neck cancer, heart cancer, Hodgkin lymphoma, islet cell carcinoma (endocrine pancreas), Kaposi sarcoma, kidney cancer (renal cell cancer), laryngeal cancer, leukaemia, liver cancer, lung cancer, medulloblastoma, melanoma, neuroblastoma, non-Hodgkin lymphoma, ovarian cancer, pancreatic cancer, pharyngeal cancer, prostate cancer, rectal cancer, renal cell carcinoma (kidney cancer), retinoblastoma, skin cancer, stomach cancer, supratentorial primitive neuroectodermal tumors, testicular cancer, throat cancer, thyroid cancer, vaginal cancer, visual pathway and hypothalamic glioma.

As used herein, an "effective amount" or "therapeutically effective amount" means the amount of agent that is sufficient to prevent, treat, reduce and/or ameliorate the symptoms and/or underlying causes of any disorder or disease, or the amount of an agent sufficient to produce a desired effect on a cell. In one embodiment, a "therapeutically effective amount" is an amount sufficient to reduce or eliminate a symptom of a disease. In another embodiment, a therapeutically effective amount is an amount sufficient to overcome the disease itself.

As used herein, the term "metastasis" or "caner metastasis" refers to the spread of tumor cells from an initial or primary site to a different or secondary site within the patient's body. Cancer occurs when cells are genetically altered to proliferate rapidly and indefinitely. This uncontrolled proliferation produces a primary heterogeneic tumor. The tumor cells eventually progress into malignant phenotype, which allows for invasion into the circulation, followed by invasion to a second site for tumorgensis. This new tumor is known as a metastatic tumor.

As used herein, the term "subject" refers to a human or any non-human animal (e.g., mouse, rat, rabbit, dog, cat, cattle, swine, sheep, horse or primate). A human includes pre and post-natal forms. In many embodiments, a subject is a human being. A subject can be a patient, which refers to a human presenting to a medical provider for diagnosis or treatment of a disease. The term "subject" is used herein interchangeably with "individual" or "patient." A subject can be afflicted with or is susceptible to a disease or disorder but may or may not display symptoms of the disease or disorder.

The term "transformation" refers to a change in a cell's genetic characteristics, and a cell has been transformed when it has been modified to contain new DNA or RNA. For example, a cell is transformed where it is genetically modified from its native state by introducing new genetic material via transfection, transduction, or other techniques. Following transfection or transduction, the transforming DNA can recombine with that of the cell by physically integrating into a chromosome of the cell, or can be maintained transiently as an episomal element without being replicated, or can replicate independently as a plasmid. A cell is considered to have been "stably transformed" when the transforming DNA is replicated with the division of the cell.

"Treating" or "treatment" of a condition as used herein includes preventing or alleviating a condition, slowing the onset or rate of development of a condition, reducing the risk of developing a condition, preventing or delaying the development of symptoms associated with a condition, reducing or ending symptoms associated with a condition, generating a complete or partial regression of a condition, curing a condition, or some combination thereof.

As used herein, the term "vector" means a nucleic acid molecule as introduced into a host cell, thereby producing a transformed host cell. A vector may include nucleic acid sequences that permit it to replicate in the host cell, such as an origin of replication. A vector may also include one or more therapeutic genes and/or selectable marker genes and other genetic elements known in the art. A vector can transduce, transform or infect a cell, thereby causing the cell to express nucleic acids and/or proteins other than those native to the cell. A vector optionally includes materials to aid in achieving entry of the nucleic acid into the cell, such as a viral particle, liposome, protein coating or the like.

Method of Treating Metastasis

With the development of the genetic engineering and targeting technology of bacteria and virus, there are more and more studies on the bacterial treatment of cancers since the middle of 1990s. Researchers have found that typhoid *salmonella* can be used as a good gene vector to effectively kill tumor cells in the body of mice in a targeted manner. *Salmonella* is a group of gram-negative, invasive intracellular facultative anaerobes that are parasitic in intestines of humans and animals. VNP20009 is an attenuated *Salmonella typhimurium* strain with deletion of msb B and pur I genes. It is genetically stable and susceptible to antibiotics. The msb B gene is necessary for the lipid acylation to form endotoxin, and its deletion prevents the lipid A terminal from being acylated and reduces toxicity. The pur I gene is involved in purine metabolism. Bacteria of pur I deletion needs exogenous adenine to reproduce. VNP20009 also reduces tumor necrosis factor (TNF) induced by typhoid *salmonella*, resulting in reduced inflammatory response. Therefore, the low pathogenicity of VNP20009 enhances its safety for clinical treatment. VNP20009 has been widely used in cancer studies. It can act on a variety of mouse solid tumor models, including melanoma, lung cancer, colon cancer, breast cancer, kidney cancer. One of the major advantages of VNP20009 as a tumor gene therapy vector is that it can aggregate at the tumor sites in a highly targeted manner. Researchers have found in a variety of mouse models of solid tumors that the amount of VNP20009 in the tumors is higher than that in the major organs such as liver by 200~1000 times. VNP20009 can aggregate and reproduce in priority in the hypoxic necrosis zone of tumor tissues. And within the same period of time, the passage number of bacteria in the tumor tissues is significantly higher than that in normal tissues, making attenuated *Salmonella* as a new anti-tumor agent and a vector of tumor targeted therapy. The possible mechanism of slowed tumor growth caused by *Salmonella* includes the nutrients required for tumor growth are consumed by the bacteria, and the enzymes produced by the bacteria such as asparaginase, can deplete the essential amino acids required for tumor growth. Furthermore, the local toxins or tumor necrosis factor α secreted by the bacteria to the extracellular microenvironment can affect tumor angiogenesis. In addition, non-specific inflammatory responses at the site of bacterial growth can potentially activate anti-tumor T cells. However, the inhibitory effect of VNP20009 on tumor metastasis has not been found yet.

The present invention is based on a surprising finding that a genetically engineered strain VNP20009-M can effectively prevent and treat metastasis of cancer. Therefore, one aspect of the present disclosure provides a method for preventing or treating metastasis of a cancer in a subject. In one embodiment, the method comprises administering a therapeutically effective amount of a genetically engineered strain VNP20009-M to the subject.

In one embodiment, the genetically engineered strain VNP20009-M is an attenuated *Salmonella typhimurium*

VNP20009 cloned with an L-methioninase gene. In certain embodiments, the genetically engineered bacterium VNP20009-M is an attenuated *Salmonella typhimurium* VNP20009 which comprises a plasmid cloned with an L-methioninase gene.

Inhibiting EZH2 by VNP20009-M

The inventors also surprisingly found that VNP20009-M can effectively inhibit histone-lysine N-methyltransferase enzyme EZH2.

EZH2 (the enhancer of zeste homologue 2) is the functional enzymatic component of the polycomb repressive complex 2 (PRC2), which is involved in chromatin condensation by adding three methyl groups to histone H3 at lysine 27 to inhibit the transcription of relevant gene (e.g. tumor suppressor gene). Studies have shown that EZH2 and histone H3K27 methylation are closely related to cancers. The high expression of EZH2 was found in lymphoma, metastatic prostate cancer and breast cancer, and was associated with breast cancer invasion. In addition, EZH2 is overexpressed in many human malignancies, such as lung cancer, lymphoma, leukemia, pancreatic cancer, cervical cancer, colon cancer, liver cancer, gastric cancer, melanoma, kidney cancer, bladder cancer, etc., and its expression level is significantly increased in metastatic tumors, often positively correlated with poor prognosis. Preclinical researches showed that the drugs targeting EZH2 can inhibit the progression of brain cancer and prostate cancer. Thus, EZH2 could serve as a potential drug target for metastatic tumor therapy, in which the treatment of tumors is achieved by downregulating the expression and activity of EZH2, reducing the histone methylation and enhancing the expressions of tumor suppressor genes.

Therefore, another aspect of the present disclosure provides a method for inhibiting histone methyltransferase EZH2 of a cell in a subject. In one embodiment, the method comprises a therapeutically effective amount of VNP20009-M to the subject, wherein the genetically engineered strain VNP20009-M is an attenuated *Salmonella typhimurium* VNP20009 cloned with an L-methioninase gene.

Tumor cells require adequate nutrition in order to maintain its high rate of reproduction. In addition to carbohydrates, the need for methionine (Met), glutamine, and arginine is particularly high. Previous studies have established that Met-dependency is a common feature of most tumor cells, such as breast cancer, lung cancer, colon cancer, kidney cancer, bladder cancer, melanoma, glioma, etc. High Met-dependency does not exist in normal cells. Both in vivo and in vitro experiments have confirmed that dietary intervention with methionine deficiency can delay the proliferation of tumor cells. However, long-term deficiency of Met can cause malnutrition, metabolic disorders, and aggravate tumor growth due to a long-term DNA hypomethylation. Thus, by specifically degrading Met to methylselenol, a-ketobutyrate and ammonia through L-methioninase and lowering the level of methionine in vivo, we will be able to effectively inhibit the growth of tumor cells or even degrade them. However, since methioninase is not expressed in mammal itself, the exogenous administration may have some side effects, often causing the body's immune response. Methionine is an essential amino acid, which produces S-adenosylmethionine (SAM) under the catalysis of methionine adenosylytransferase. SAM, also known as active methionine, is the most important methyl donor in vivo, which is involved in the methyl transfer catalytic reaction of various substances such as DNAs, proteins in the body. EZH2 can transfer the active methyl group of SAM to specific amino acids of histone, so as to involve in the epigenetic modification of chromosomes, and inhibit the transcription of related genes. The methioninase can decompose the content of methionine in vivo, which can not only promote tumor cell apoptosis, but may also be effective in inhibiting the EZH2 activity through reducing the SAM content, thereby inhibiting tumor metastasis.

The following examples are presented to illustrate the present invention. They are not intended to limiting in any manner.

EXAMPLE 1

The following example illustrates the construction of a genetically engineered bacterium.

Construction of a Plasmid Expressing the L-Methioninase Gene

The L-methioninase (GenBank: L43133.1) gene was synthesized and subcloned to pUC57 plasmid (Genscript), then subcloned to pSVSPORT plasmid (invitrogen) through the Kpn I and Hind III restriction sites, to get the pSVSPORT-L-methioninase expression plasmid. The specific procedure is as follows:

The pSVSPORT plasmid was digested with Kpn I and Hind III, with the digestion system: 2 µg of plasmid DNA, 3 mL of 10× buffer, 1.5 µL of Kpn I enzyme, 1.5 µL of Hind III enzyme, added ddH$_2$O to 30 µL, incubate for 3 h at 37° C., then the digests was separated by 1% agarose gel electrophoresis, to cut out DNA bands with the size of 4.1 kb, then DNA was purified by gel recovery and purification kit.

DNA fragments of L-methioninase coding region were obtained by gene synthesis and subcloned to pUC57 plasmid (Genscript), digested with Kpn I and Hind III, with the digestion system: 3 µg of plasmid DNA, 3 mL of 10× buffer, 1.5 µL of Kpn I enzyme, 1.5 µL of Hind III enzyme, added ddH$_2$O to 30 µL, warm bath for 3 h at 37° C., then the digestion system was separated by 1% agarose gel electrophoresis, to cut out DNA bands with the size of 1.2 kb, then DNA was purified by gel recovery and purification kit.

The pSVSPORT (Kpn I/Hind III) and DNA fragment of the L-methioninase coding region (Kpn I/Hind III) were ligated. The ligation reaction condition: 2 mL of vector, 6 µL of inserted fragment, 1 µL of T4 DNA ligase, water bath for 16 h at 16° C.

The ligation product was transformed into competent cells of *E. coli* DH5a (Takara). One tube of 50 mL DH5a competent cells was placed on the ice until thawing, then 5 µL of above ligation product was added, mixed well by flicking, incubated on ice for 30 min; after heat shock 60 s at 42° C., placed on ice for 2 min; then 500 µL of non-resistant LB liquid medium was added and incubated at 37° C. for 1 h with shaking, then spread on ampicillin resistant LB medium plate and cultured overnight.

When clones grew, single clone was inoculated to 3 mL of ampicillin-containing LB medium, incubated at 37° C. for 16 h. The plasmid DNA was extracted and identified by Kpn I and Hind III digestion. Two DNA bands at the size of 4.1 kb, 1.2 kb were obtained in the positive clones, as shown in FIG. 1. The sequence of the positive clones was further confirmed by sequencing.

Construction of Plasmid-Bearing VNP20009 Strain and VNP20009 Strain Bearing a Plasmid Cloned with L-Methioninase Gene The pSVSPORT and pSVSPORT-L-methioninase expression plasmids are electro-transformed to VNP20009 strain (YS1646, ATCC No. 202165) respectively, and named as VNP20009-V and VNP20009-M, respectively. The specific construction process is as follows:

The competent bacteria VNP20009 was placed on ice, after melted, transferred to a pre-cooled electric rotating-cup and 2 mL of the plasmid was added, mixed well by flicking, incubated on ice for 30 min; after heat shock 60 s at 42° C., placed on ice for 1 min. The electric rotating-cup was placed into an electroporator, and the condition was set to voltage 2400V, resistance 400Ω, capacitance 25 µF, discharge time 4 ms. After the electric shock, 1 mL SOC medium was added and mixed well gently, incubated at 37° C. for 1 h with shaking. After the bacterial precipitation was blown by a pipette and uniformly spread on an ampicillin-resistant LB-O medium plate, then incubated 16 h at 37° C. incubator. After the VNP20009-V and VNP20009-M were cultured with LB-O, the plasmids were extracted and identified by restriction enzyme digestion.

Figure 2:
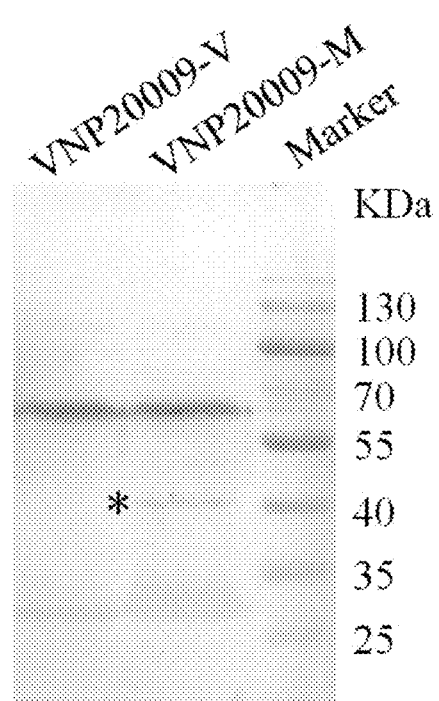
FIG. 2 shows the Western blot analysis of methioninase expression.

The protein was extracted from $1\times10^8$ Salmonella and separate by 10% SDS-PAGE electrophoresis, transferred to PVDF membrane under constant voltage, after blocked 1 h with BSA at room temperature, rinsed 3×5 min with TBST, added with the rabbit anti-L-methioninase antibody (1:1000) overnight at 4° C., rinsed with TBST 3 times, 5 min each time, then HRP labeled anti-rabbit secondary antibody (1:10000) was added, incubated at room temperature for 1 h, rinsed with TBST 3 times, 5 min each time, developed using the enhanced chemiluminescent (ECL). The results are shown in FIG. 2. Specific bands were found at about 43 kD molecular weight, indicating that the expression of L-methioninase significantly increased in VNP20009-M compared with that in VNP20009 and VNP20009-V.

Figure 3:
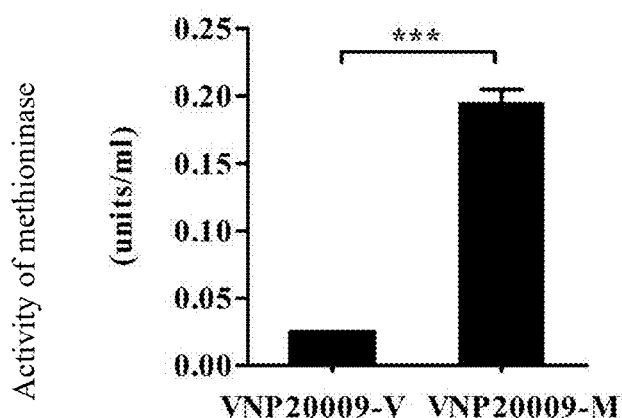
FIG. 3 shows the detection of methioninase activity in *salmonella*.

L-methionine and pyridoxal were mixed with VNP20009-V and VNP20009-M strains respectively, and incubated at 37° C. for 10 min. After terminated by 50% trichloroacetic acid, the mixed solution was centrifuged to get the supernatant, then well mixed with 3-methyl-2 MBTH; after incubated at 50° C. for 30 min, the absorbance at 320 nm was determined. The amount of enzyme that catalyzes to covert α-ketobutyric acid was defined as one unit of enzyme activity. The results are shown in FIG. 3. The methioninase activity of Salmonella VNP20009-M was 10 times higher than that of VNP20009-V.

EXAMPLE 2

Figure 4:
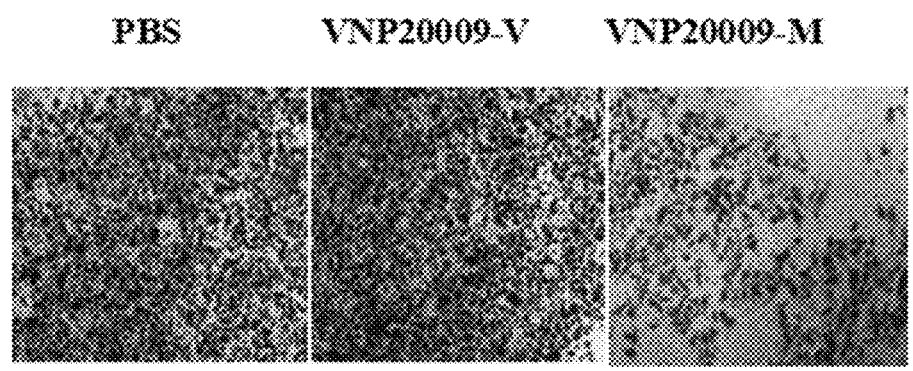
FIG. 4 shows the detection of invasion of prostate cancer cells inhibited by genetically engineered strain VNP20009-M by transwells assay (***, $p<0.001$).
Figure 4:
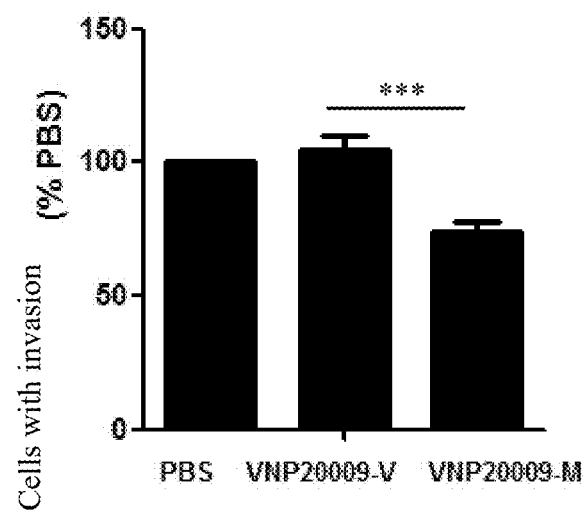
Figure 5:
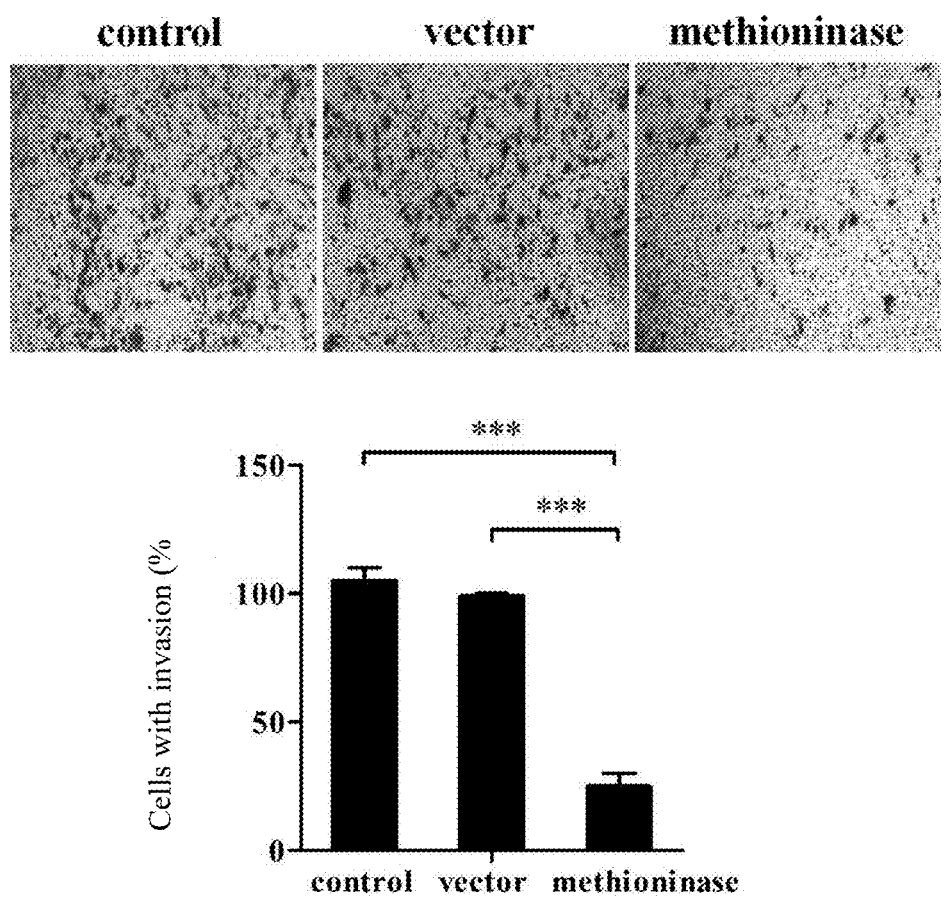
FIG. 5 shows the detection of invasion of prostate cancer cells inhibited by methioninase by transwells assay (***, $p<0.001$).
Figure 6:
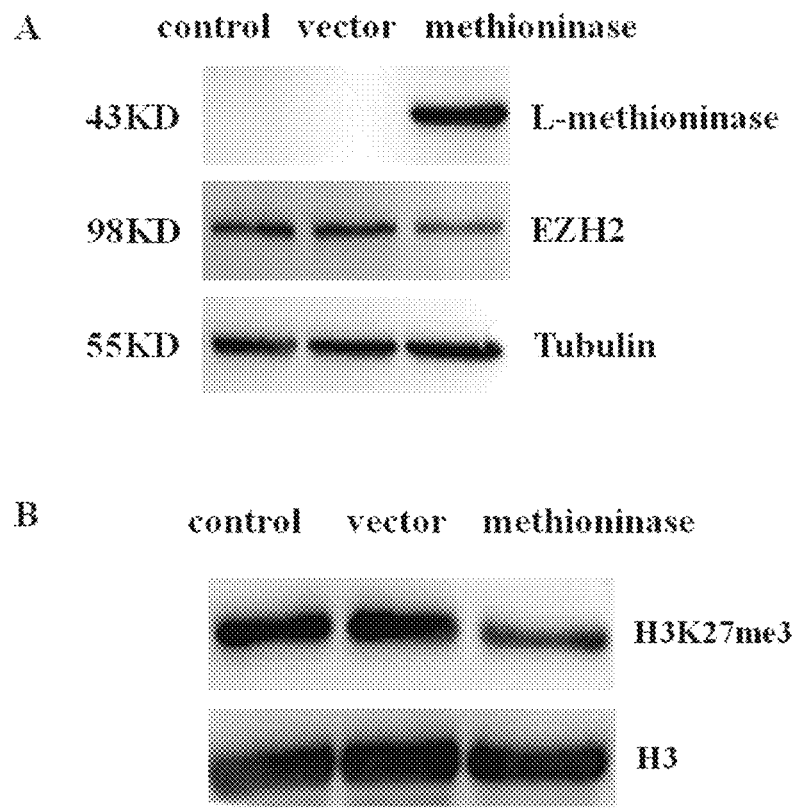
FIG. 6 shows the Western blot analysis of EZH2 and H3K27me3 expression in prostate cancer cell PC-3 cell after high expression of methioninase.

The following example illustrates the effect of genetically engineered strain VNP20009-M on metastasis of prostate cancer.
Effect of Genetically Engineered Strain VNP20009-M on the Invasion of Prostate Cancer Cells The prostate cancer cell PC-3 (androgen-independent) in the logarithmic growth phase were inoculated into 6-well plates until the cell density is about 70%-80%, then VNP20009-V and VNP20009-M were added at $1\times10^6$ CFU/well; in addition, a blank control group was established. After co-cultured with cells for 30 min, the bacteria were rinsed 5 times with PBS, then the cells were digested with trypsin and centrifuged to collect for counting, then the cells were added to transwell chambers with matrigel gel according to $5\times10^5$/chamber, with serum-free medium on the upper chamber and medium containing 20% fetal bovine serum on the lower chamber. Both PBS and medium contained 12 µg/mL penicillin, 20 µg/mL streptomycin, 10 µg/mL kanamycin. The cells were cultured for 36 h and then stained with crystal violet. The cells that passed through the chambers were photographed and counted. The results are shown in FIG. 4, ** indicating P<0.01. The results showed that after VNP20009-M stain was co-cultured with prostate cancer cells, the number of cells that passed through chambers was significantly reduced compared with that in the PBS group and VNP20009-M group, suggesting that VNP20009-M significantly inhibited the invasion of tumor cells.
Effect of Methioninase on Invasion of Prostate Cancer Cells The prostate cancer cell PC-3 in the logarithmic growth phase were inoculated into 6-well plates until the cell density was about 70%-80%, the empty vector (vector) and the plasmids with high expression of methioninase; in addition, a blank control (control) group was established. Transwell assay was performed 24 hours after transfection according to the operation procedures as stated above. The results are shown in FIG. 5. After high expression of methioninase, the prostate cancer cells that passed through chambers were decreased, suggesting that the cell invasion was reduced. 48 hours after transfection, the total proteins were extracted, and the HMT EZH2 was detected by western blot. 60 hours (72 hours) after transfection, the nucleoprotein was extracted, and the histone H3K27 of the EZH2 downstream target molecule was detected by western blot. The results are shown in FIG. 6. After high expression of methioninase, the expression of methyltransferase EZH2 decreased, and the methylation level of histone H3K27 decreased, suggesting that the EZH2 activity significantly decreased.

Figure 7:
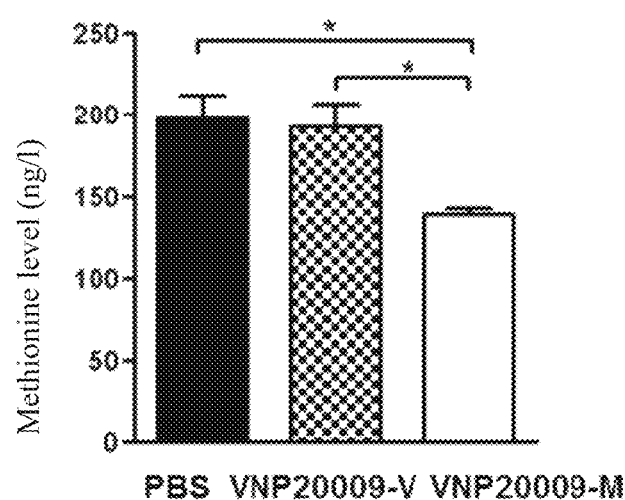
FIG. 7 shows quantification of methionine level in tumor tissues by LC-MS/MS (*, $p<0.05$).
Figure 8:
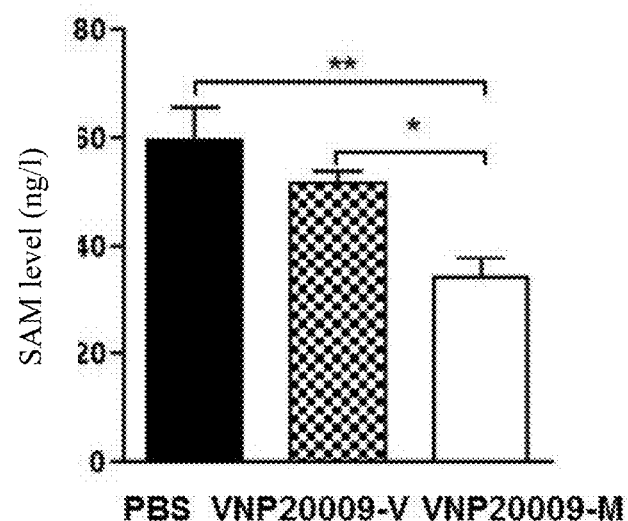
FIG. 8 shows quantification of SAM level in tumor tissues by LC-MS/MS (**, $p<0.01$; *, $p<0.05$).

$2\times10^6$ PC-3 cells were injected subcutaneously into the flanks of nude mice. When the tumor size reaches 0.1~0.2 cm$^3$, tumor-bearing mice are randomized as: PBS control, VNP20009, VNP20009-V and VNP20009-M groups. Mice are administered by intratumoral injection at a dose of $2\times10^6$ CFU each while the control group are administered with the same volume of PBS. On day 10 post-treatment, the tumors are dissected from nude mice and protein is extracted from tumor tissues. LC-MS/MS was performed to determine methionine and SAM in tumor tissues. After administered with Salmonella VNP20009-M, the methionine content of the tissue is significantly decreased, about ¾ of those in PBS and VNP20009-V groups (FIG. 7). The SAM content is also significantly decreased, about ⅔ of those in PBS and VNP20009-V groups (FIG. 8). The above results suggest that VNP20009-M can successfully decrease the level of methionine and SAM in tumors, makes it be an EZH2 inhibitor.

The above results suggest that the expression of methioninase after invasion of tumor cells by VNP20009-M may reduce the invasion and metastasis of tumor cells by decreasing the expression and activity of HMT EZH2.
Effect of Genetically Engineered Strain VNP20009-M on Metastasis of Transplanted Prostate Cancer Cells To trace the metastasis of prostate cancer cells in vivo, the inventors constructed tumor cell lines expressing luciferase. The 293FT cells in the logarithmic growth phase were inoculated in 6-well plates at 37° C., 5% CO$_2$ overnight. On the next day, 293FT cells were transfected with Roche transfection reagent, and 1.5 µg PLGM1-luc, 1.125 µg psPAX2, 0.35 µg PMD2.G plasmid were co-transfected each well. 48 h after transfection, the cell culture supernatant was collected, centrifuged at 3000 r/min for 5 min, and the supernatant was stored at −80° C., i.e. the luciferase lentivirus. The prostate cancer cell PC-3 and pancreatic cancer cell CFPAC-1 were inoculated to 6-well plates respectively. On the next day, 1 ml (about $1.0\times10^8$ infection titer) luciferase lentivirus and polybrene at final concentration of 8 µg/ml were added to each well. Selection of cells was performed 24 h later by adding puromycin in the medium. Medium was replaced once every two days. Two weeks later, tumor cell lines PC-3-luc and CFPAC-luc that stably express luciferase were obtained.

The PC-3-luc cells were cultured in F-12K medium containing 10% fetal bovine serum. $5 \times 10^5$ cells were injected to the nude mice by tail veins. The tumor-bearing nude mice were randomly divided into 3 groups: PBS group, VNP20009-V group and VNP20009-M group, 10 mice in each group.

Figure 9:
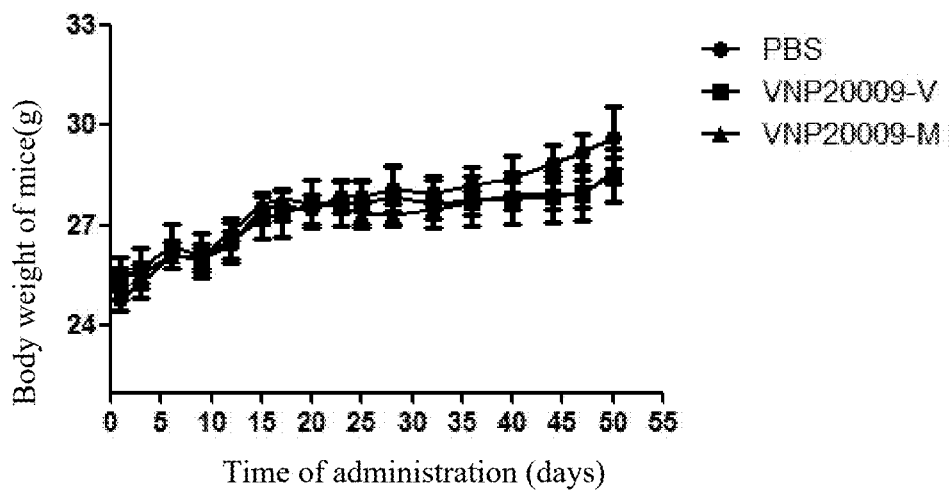
FIG. 9 shows the effect of injection of *Salmonella* on the weights of nude mice.

VNP20009-V and VNP20009-M were cultured with LB-O. When OD≈0.6, the bacteria were collected and resuspended with PBS. Bacteria were injected via tail vein at a dose of $2 \times 10^5$ CFU/mouse; and in the control group, same volume of PBS is injected. After administration, the activity, diet and weight of nude mice were observed. The results are shown in FIG. 9. After injection of bacteria, the body weights of mice were not affected; moreover, diet and feces of mice showed no abnormality, suggesting that VNP20009-V and VNP20009-M have no significant toxicity on nude mice.

Figure 10:
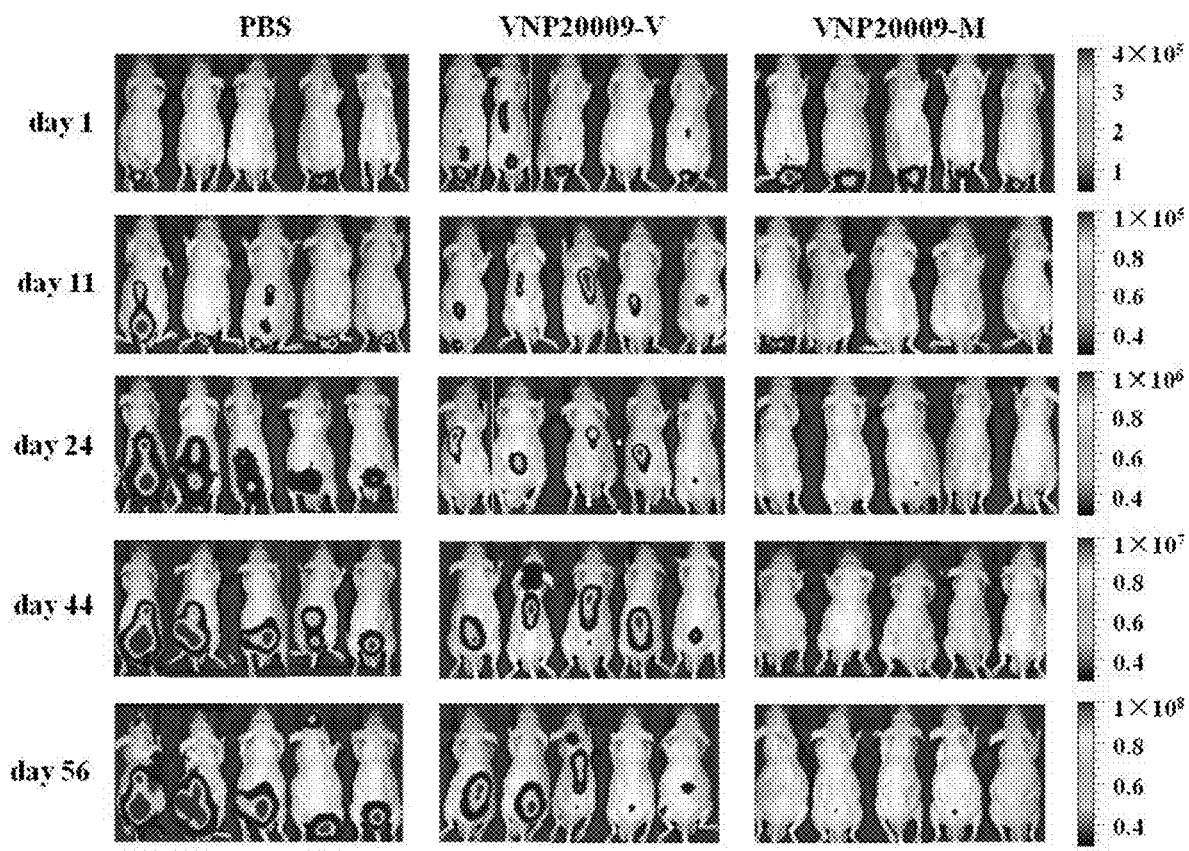
FIG. 10 shows the change of prostate cancer signal over time by in vivo imaging after intravenously administered with $2\times10^5$ CFU *salmonella*.
Figure 11:
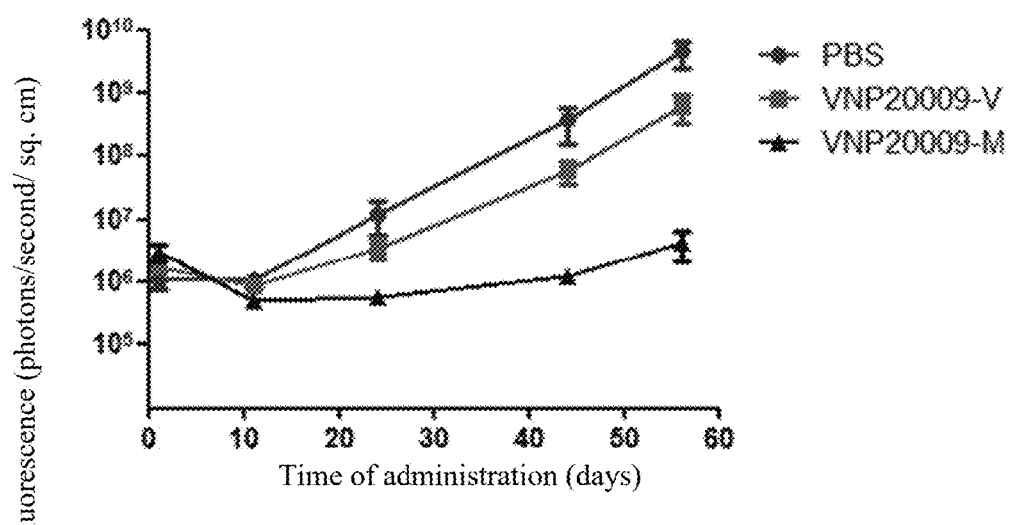
FIG. 11 shows the curve of signal changes of prostate cancer after intravenously administered with $2\times10^5$ CFU *salmonella*.
Figure 12:
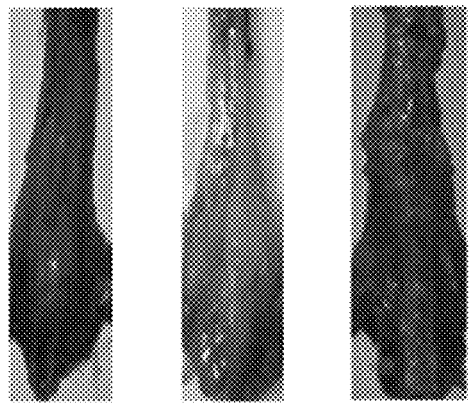
FIG. 12 shows the tumor size in the spine of mice with prostate cancer 55 days after intravenously administered with 2×10⁵ CFU *salmonella*.
Figure 13:
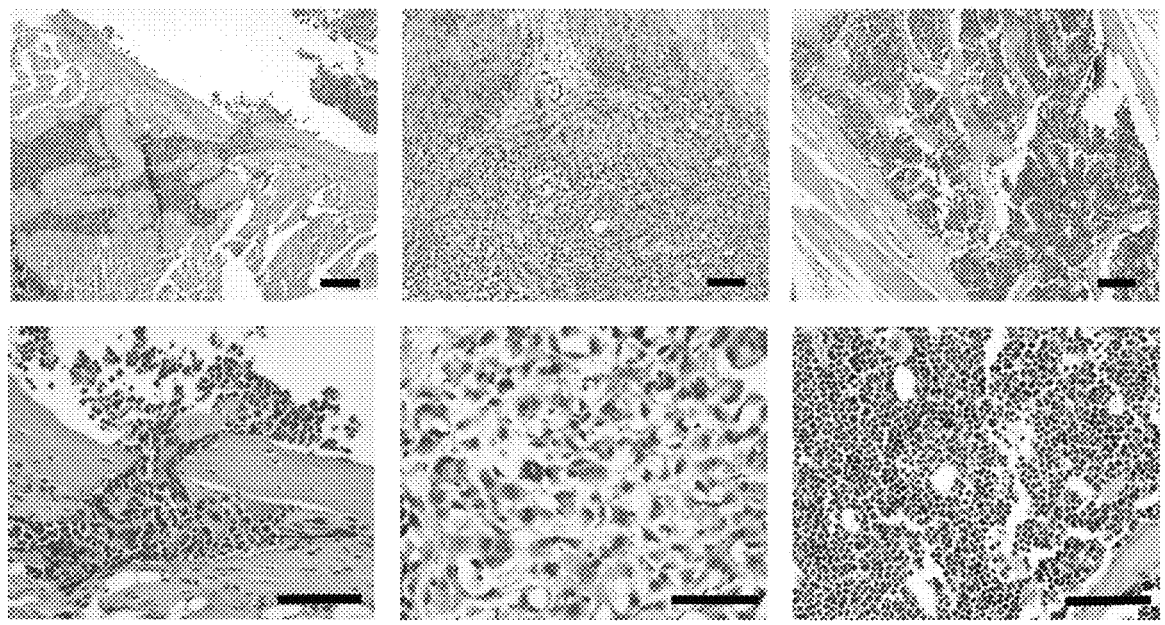
FIG. 13 shows pathological sections by HE staining of the spinal of mice with prostate cancer 55 days after intravenously administered with 2×10⁵ CFU *salmonella*.
Figure 14:
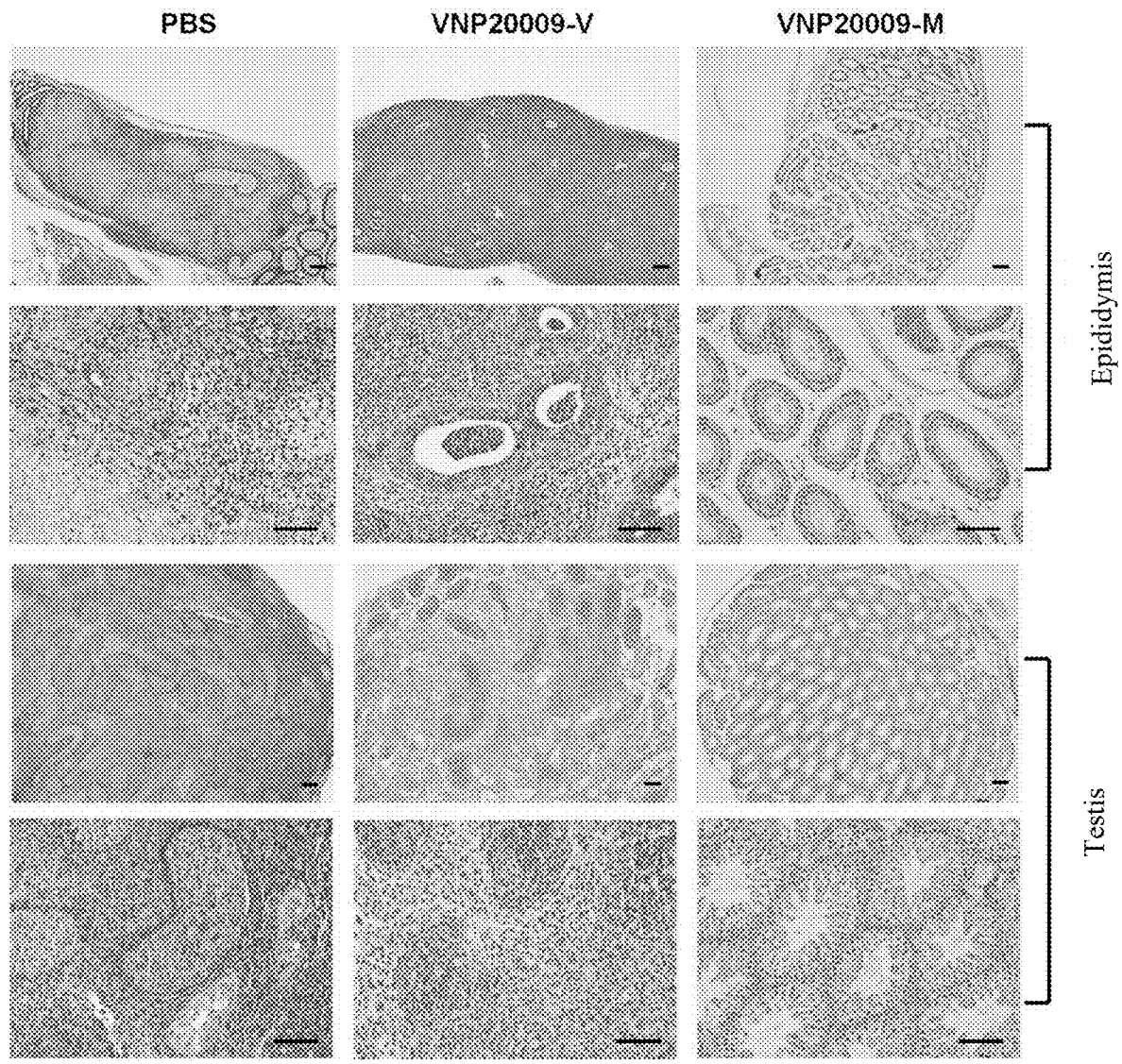
FIG. 14 shows pathological sections by HE staining of the testis and epididymal of mice with prostate cancer 55 days after intravenously administered with 2×10⁵ CFU *salmonella*.

On the 1st, 11th, 24th, 44th and 56th day after the administration, the tumor metastasis and growth condition of mice were observed using the in vivo small animal imaging system (Caliper). Each mouse was injected with 150 µg/kg D-fluorescein potassium intraperitoneally, and reacted with luciferase expressed in tumor cells to produce an optical signal. The mice were imaged by an instrument to show the location and quantity of tumor cells. Results are shown in FIG. 10. One day after administration, the tumor signal intensity of each group was substantially the same. However, from the $11^{th}$ day after administration, strong signals appeared at the spines and epididymis of mice in the PBS group and VNP20009-V group, and the body signals of the two groups were linearly enhanced over time (FIG. 11). From the $45^{th}$ day, protrusions with the size of soybean were observed at the spines of mice in the PBS group, which were hard with poor mobility. After dissection, tumor mass formation was found at the spines of nude mice, and the metastatic tumors were in gray and aggregated to lumps on the lumbar surface with a diameter of about 1 cm (FIG. 12). The signal intensity of tumor cells in VNP20009-M group was significantly lower than that in PBS group and VNP20009-V group, and the optical signal was almost unable to be detected in some mice. The results of pathological sections of mice tissues (FIG. 13) are consistent with the results of small animal in vivo imaging. There were densely undifferentiated epithelial tumor cells in the vertebral medullary cavity of mice in the PBS group and VNP20009-V group, and cells were disordered with obvious heteromorphy, big nuclei and deep dyeing, polymorphic, uneven number of chromatins in the nuclei; and the vertebral bones were destroyed by tumor cells. At the same time, a large number of tumor cell infiltration was also found in the testis and epididymis of the two groups of mice (FIG. 14). However, only a small amount of tumor cells were observed in the vertebrae, testis and epididymis of the VNP20009-M group, and no tumor cells were observed in some mice. In addition, no significant tumor infiltration was observed in the lungs, livers and kidneys of mice in each group. These results suggest that *Salmonella* VNP20009-M can significantly inhibit the metastases and growing of prostate cancer to bones.

EXAMPLE 3

The following example illustrates the effect of genetically engineered strain VNP20009-M on metastasis of pancreatic cancer.

Figure 15:
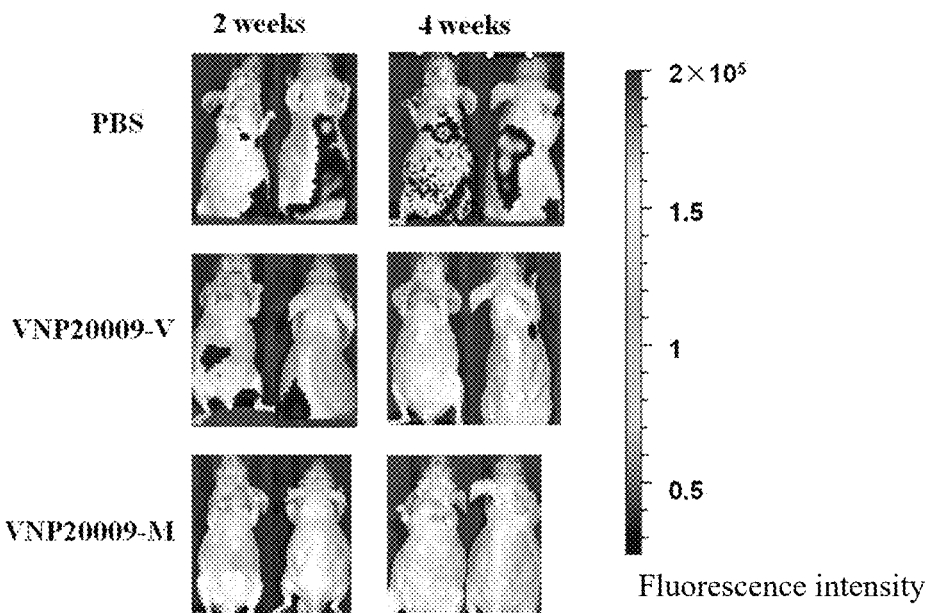
FIG. 15 shows the change of pancreatic cancer signal over time by in vivo imaging after intravenously administered with 2×10⁶ CFU *salmonella*.

The operation procedures were the same as in Example 2 above. The same amount of pancreatic cancer cell CFPAC-luc was injected via tail veins. On the $3^{rd}$ day after modeling, bacteria were injected via tail veins at a dose of $2 \times 10^6$ CFU/mouse; in the control group, the same volume of PBS was injected. Similarly, the tumor metastasis condition was observed by in vivo imaging periodically. The results showed that strong bioluminescence signals appeared in the PBS group and VNP20009-V group, mainly in the lungs. But signals could be barely observed in the VNP20009-M group (FIG. 15). These results suggest that *Salmonella* VNP20009-M can inhibit the metastasis and growth of pancreatic cancer effectively.

EXAMPLE 4

The following example illustrates the effect of genetically engineered strain VNP20009-M on metastasis of breast cancer.

Figure 16:
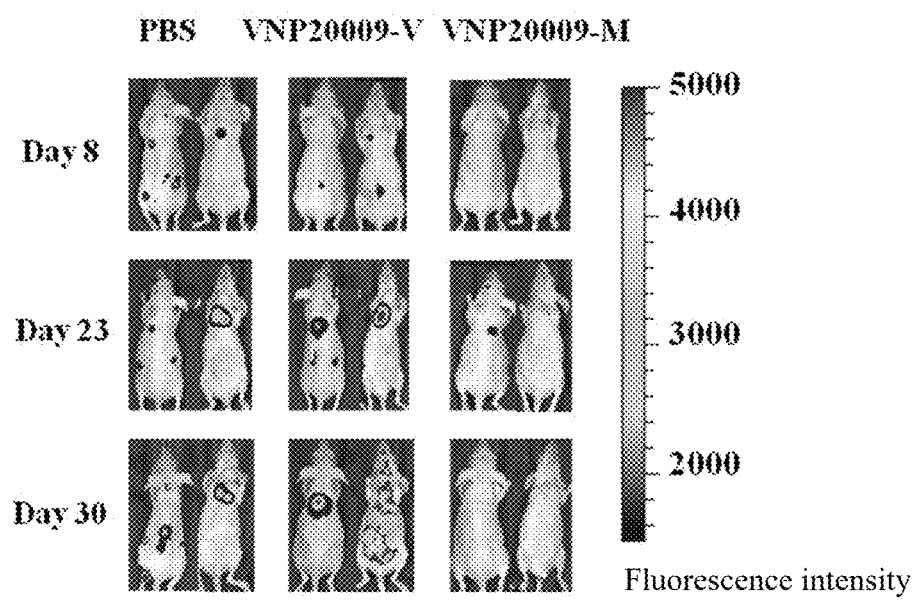
FIG. 16 shows the change of breast cancer signal over time by in vivo imaging after intravenously administered with 2×10⁵ CFU *salmonella*.
Figure 17:
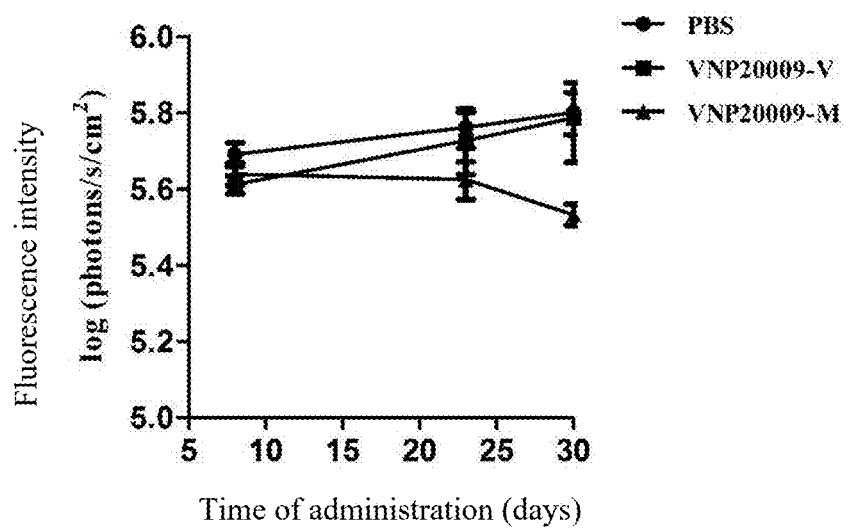
FIG. 17 shows the curve of signal changes of mice with breast cancer after intravenously administered with 2×10⁵ CFU *salmonella*.
Figure 18:
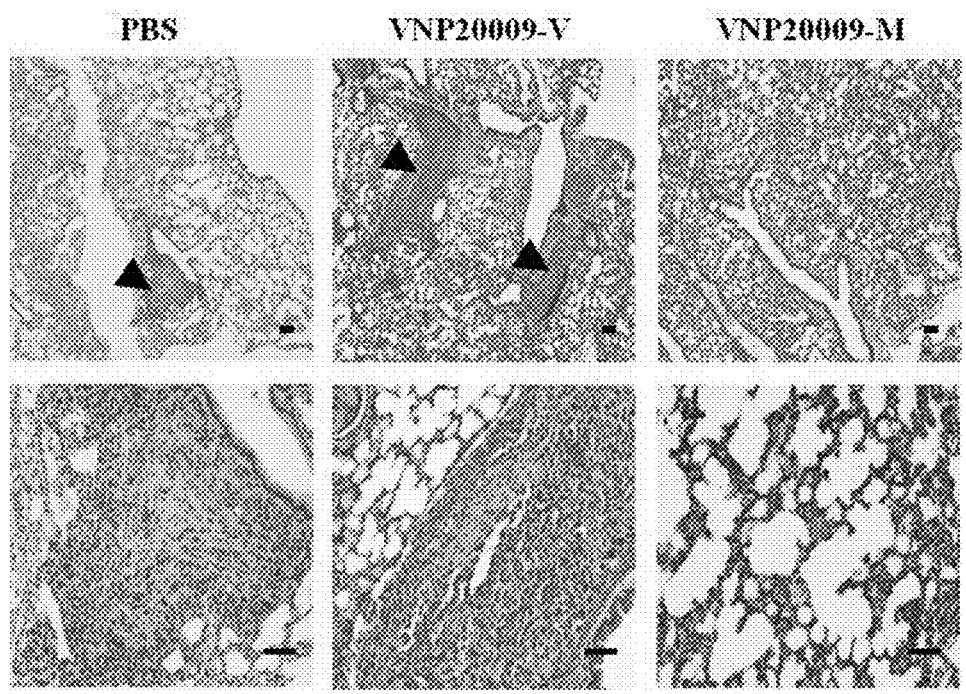
FIG. 18 shows the results of pulmonary pathology in mice with breast cancer after administration of 2×10⁵ CFU *Salmonella* (The arrows indicate the breast cancer cells infiltrate into the lung of mice).

The operation procedures were the same as in Example 2 above. $1.25 \times 10^5$ breast cancer cells MDA-MB-231-luc were injected via tail veins. On the $3^{rd}$ day after modeling, bacteria were injected via tail veins at a dose of $2 \times 10^5$ CFU/mouse; in the control group, the same volume of PBS was injected. Similarly, the tumor metastasis was observed by in vivo imaging periodically. The results showed that strong bioluminescence signals appear in the PBS group and VNP20009-V group, mainly in the lungs, and the signal intensity was significantly increased over time (FIG. 16, FIG. 17). The results of pathological sections of mice were consistent with those of in vivo imaging. There was infiltration of tumor cells in the lungs of the mice in the PBS and VNP20009-V groups and these cells had large nuclei and deep dyeing with obvious heteromorphy. (The arrows indicate the tumor cells in FIG. 18). In the VNP20009-M group, basically no signals were observed, and the pathological sections results showed that the tumor cells were significantly reduced, and even no tumor was observed. In addition, tumor metastases were observed in the spines of mice in the PBS group, and no abnormality was observed in other tissues. These results suggest that *Salmonella* VNP20009-M can also effectively inhibit the metastasis and growth of breast cancer.

EXAMPLE 5

The following example illustrates the effect of genetically engineered strain VNP20009-M on metastasis of lung cancer.

Figure 19:
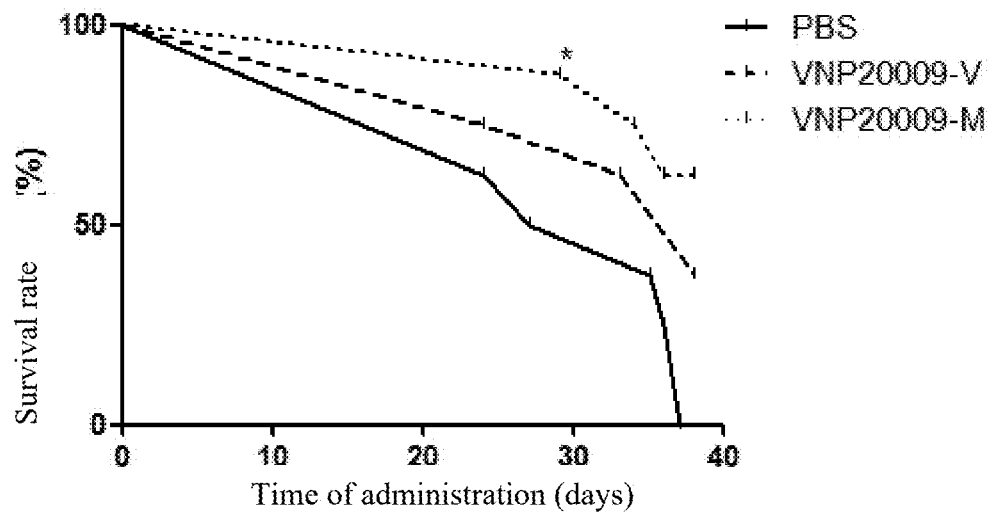
FIG. 19 shows the survival rate of mice with lung cancer after intravenously administered with 2×10⁶ CFU *salmonella*.
Figure 20:
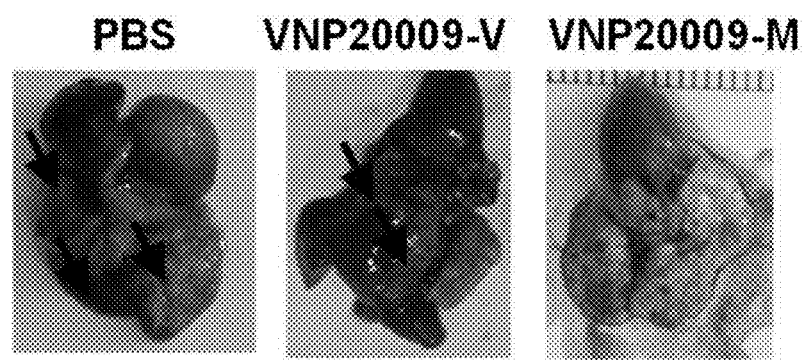
FIG. 20 shows the lung tumors in mice after intravenously administered with 2×106 CFU *salmonella*. The arrow indicates the lung tumors of mice.

The operation procedures were the same as in Example 2 above. $5 \times 10^5$ lung cancer cells LLC were injected via tail veins in B6 mice. On the $3^{rd}$ day after modeling, bacteria were injected via tail veins at a dose of $2 \times 10^6$ CFU/mouse; in the control group, the same volume of PBS was injected. After administration, the body weights of the mice were measured periodically; the states of the mice were observed to record the time of death of mice. The results showed that all mice in PBS group died within 38 days, while 40% of mice survived in the VNP20009 group, and 60% of mice survived in the VNP20009-M group. The survival results showed that VNP20009-M significantly prolonged the survival time of tumor-bearing mice (FIG. 19). The dissection of mice showed that the mice in the PBS group and VNP20009-V group had severe lung cancer, while the lung metastasis in mice in the VNP20009-M group was significantly smaller and less than that of the control group (FIG.

20). These results suggest that *Salmonella* VNP20009-M is also effective in inhibiting the growth and metastasis of the lung cancer.

EXAMPLE 6

The following example illustrates the effect of genetically engineered strain VNP20009-M on metastasis of liver cancer.

Figure 21:
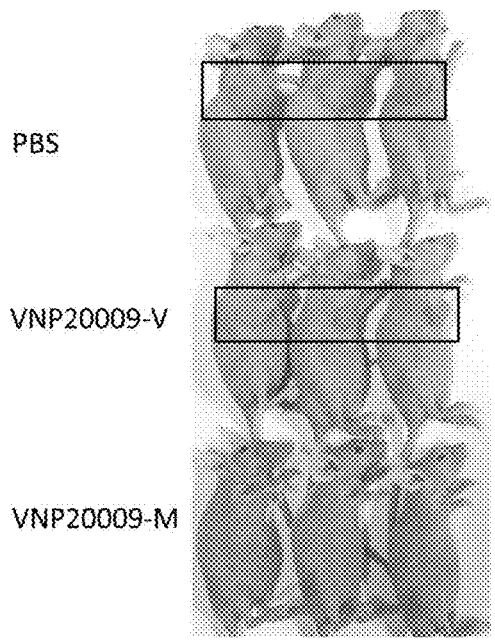
FIG. 21 shows the tumor size in mice with hepatocellular carcinoma after administration of 2×10⁵ CFU *Salmonella*.
Figure 22:
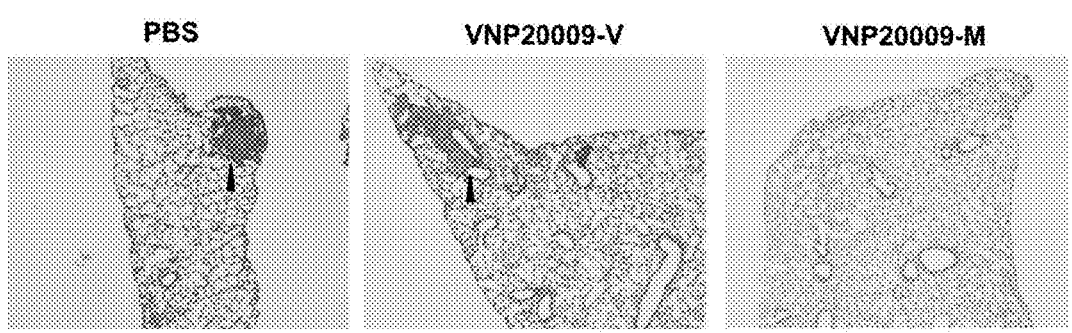
FIG. 22 shows the results of pulmonary pathology in mice with hepatocellular carcinoma after administration of 2×10⁵ CFU *Salmonella* (The arrows indicate the liver cancer cells infiltrate into the lung of mice).

The operation procedures were the same as in Example 2 above. $2\times10^6$ human hepatocellular carcinoma cells HCCLM3 with high metastatic potential were injected subcutaneously into the flanks of nude mice. On day 3 after modeling, tumor-bearing mice are randomized: PBS, VNP20009-V and VNP20009-M groups. Mice are administered by intratumoral injection at a dose of $2\times10^5$ CFU each, while the control group are administered with the same volume of PBS. As shown in FIG. 21, the tumors in the control group grow rapidly. After administered with *Salmonella* VNP20009-M, the tumor growth mostly arrests and the tumor disappeared in some mice. The pathological results reveal that there is infiltration of tumor cells into the lung of mice in the PBS and VNP20009-V groups, which nuclei are large, deep dyeing and marked atypia (The arrows indicate the tumor cells in FIG. 22). The Pulmonary lesions in the VNP20009-M groups are significantly reduced, and even no tumor is observed. These results suggest that *Salmonella* VNP20009-M is also effective in inhibiting the growth and metastasis of the hepatocellular carcinoma.

The above animal tests showed that the attenuated *Salmonella typhimurium* VNP20009-M used in the present invention can inhibit tumor metastasis by inhibiting the expression and activity of EZH2, and has a good antitumor effect.

The present invention has shown that attenuated *Salmonella typhimurium* VNP20009-M can be used for preventing and treating cancer metastasis. In addition to prostate cancer, breast cancer, pancreatic cancer and lung cancer, it has effect for the metastases of other cancers, such as liver cancer, colon cancer, rectal cancer, stomach cancer, esophageal cancer, laryngeal cancer, leukemia, lymphoma, melanoma, uterine cancer, ovarian cancer, skin cancer, bronchial carcinoma, bronchiolar carcinoma, urethral cancer, kidney cancer, oral cancer, vaginal cancer, cholangiocarcinoma, bladder cancer, nasopharyngeal carcinoma, etc. The above plasmids are not limited to pSVSPORT plasmid, pTrc99A plasmid, pcDNA3.1 plasmid, pBR322 plasmid or pET23a plasmid and the above plasmids cloned with L-methioninase gene can achieve similar effects.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A method for treating metastasis of a cancer in a human subject, the method comprising administering a therapeutically effective amount of a genetically engineered strain VNP20009-M to the human subject, wherein the genetically engineered strain VNP20009-M is an attenuated *Salmonella typhimurium* VNP20009 comprising an L-methioninase gene, wherein the VNP20009-M is administered intravenously or intratumorally, and wherein the cancer is prostate cancer or liver cancer.

2. The method according to claim 1, wherein the genetically engineered strain VNP20009-M is an attenuated *Salmonella typhimurium* VNP20009 which comprises a vector comprising the L-methioninase gene.

3. The method according to claim 2, wherein the genetically engineered strain VNP20009-M is constructed according to the following method: inserting the L-methioninase gene into the vector to obtain an L-methioninase expression plasmid; electro-transforming the L-methioninase expression plasmid to attenuated *Salmonella typhimurium* VNP20009; and obtaining the VNP20009-M.

4. The method according to claim 3, wherein the vector is a pSVSPORT plasmid, a pTrc99A plasmid, a pcDNA3.1 plasmid, a pBR322 plasmid or a pET23a plasmid.

5. The method according to claim 1, wherein the cancer is prostate cancer.

6. The method according to claim 1, wherein the cancer is liver cancer.

* * * * *